United States Patent [19]

Trott

[11] Patent Number: 4,814,186

[45] Date of Patent: Mar. 21, 1989

[54] POLYMER FILTRATION APPARATUS

[75] Inventor: Delano B. Trott, Marblehead, Mass.

[73] Assignee: Beringer Co., Inc., Marblehead, Mass.

[21] Appl. No.: 162,052

[22] Filed: Feb. 29, 1988

[51] Int. Cl.[4] .......................................... A01J 17/00
[52] U.S. Cl. ..................................... 425/199; 55/310;
55/312; 55/481; 55/484; 210/332; 210/334;
210/340; 210/459; 210/436; 210/472
[58] Field of Search ............................... 425/197–199,
425/461; 55/309, 310, 312, 481, 484; 210/236,
436, 340, 332, 472, 334, 429

[56] References Cited

U.S. PATENT DOCUMENTS

| | | | |
|---|---|---|---|
| 3,007,199 | 11/1961 | Curtis | 18/12 |
| 3,501,806 | 3/1970 | Schrader | 425/198 |
| 3,503,096 | 3/1970 | Marianelli | 425/199 |
| 3,804,758 | 4/1974 | Cooper et al. | 210/65 |
| 3,856,680 | 12/1974 | Elmore | 210/184 |
| 3,900,399 | 8/1975 | Kreyenborg et al. | 210/236 |
| 3,962,092 | 6/1976 | Newman, Jr. | 210/236 |
| 3,983,038 | 9/1976 | Heston | 210/447 |
| 4,025,434 | 5/1977 | Mladota | 210/236 |
| 4,167,384 | 9/1979 | Shirato et al. | 425/183 |
| 4,237,014 | 12/1980 | Trott | 210/330 |
| 4,395,212 | 7/1983 | Lambertus | 425/185 |
| 4,511,472 | 4/1985 | Trott | 210/340 |
| 4,701,118 | 10/1987 | Koching et al. | 425/198 |

FOREIGN PATENT DOCUMENTS

| | | |
|---|---|---|
| 1131875 | 9/1958 | Fed. Rep. of Germany . |
| 1800169 | 10/1968 | Fed. Rep. of Germany . |
| 132230 | 10/1980 | Japan .................................. 425/197 |

OTHER PUBLICATIONS

Four page brochure of Joachim Kreyenborg & Co., D-4400 Munster-Kinderhaus, West Germany, and translation of pp. 2 and 3 thereof.

Primary Examiner—Bernard Nozick
Attorney, Agent, or Firm—Lahive & Cockfield

[57] ABSTRACT

Polymer filtration apparatus comprising a body having a pair of upstream passages each terminating at a slide channel and a pair of downstream passages respectively opposing the upstream passages, and a slide member in the channel having apertures for a pair of replaceable filters each normally communicating between an upstream passage and a downstream passage. The extents of the channel surfaces between the pairs of passages and between each passage and the exterior of the body, and the extents of the filter apertures on the slide member are related so that one filter remains active when the slide member is in position for replacing the other filter. After a filter has been replaced the new filter may be prefiled without pressure loss in the polymer or excessive leakage thereof.

9 Claims, 3 Drawing Sheets

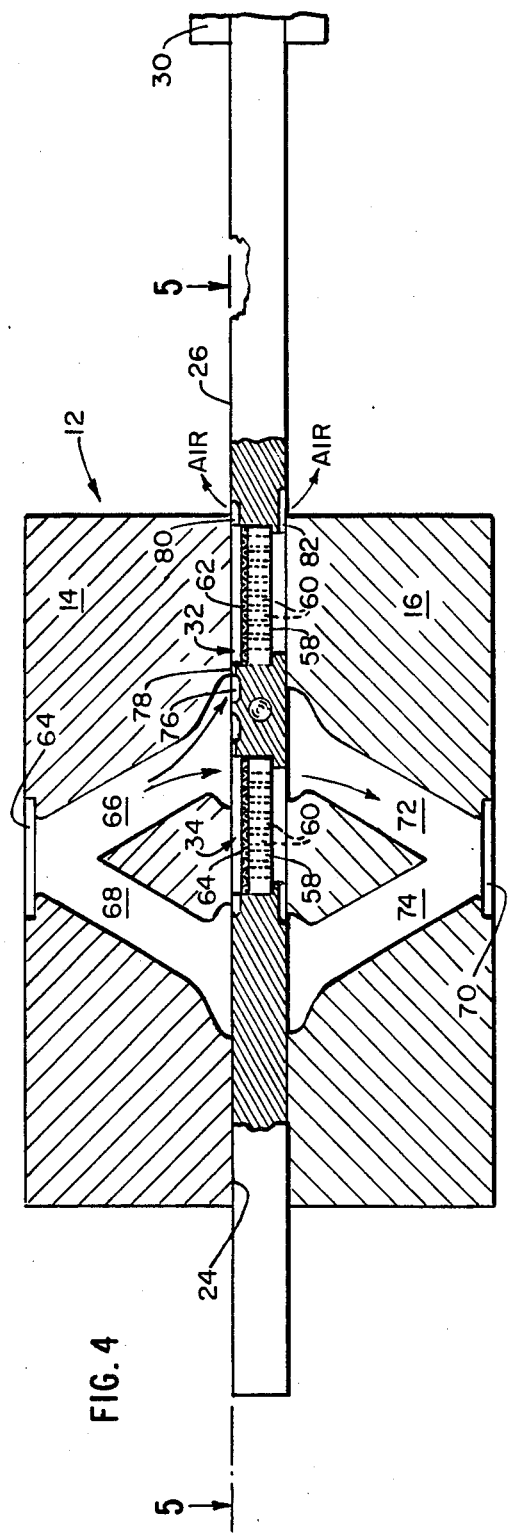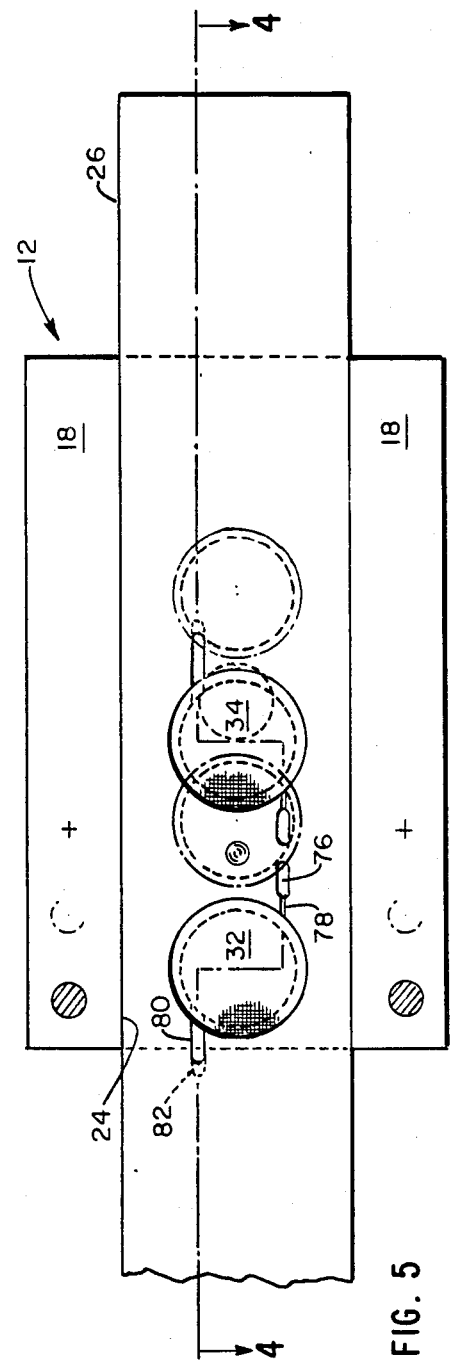

POLYMER FILTRATION APPARATUS

BRIEF SUMMARY OF THE INVENTION

This invention relates generally to polymer filtration systems that connect between plastic extruders and plastic forming or processing apparatus, typically dies. More particularly, the invention relates to apparatus for supporting filtration screens in the polymer flow path, and for changing the screens when they become occluded by foreign particles or solid lumps of the polymer.

A simplified polymer filtration system comprises a single polymer flow passage with a single slide member movable across the passage for locating a replaceable filter therein. In such a system the flow passage is temporarily blocked by the slide member when it is shifted to a position in which the filter is external to the body of the apparatus. The loss of downstream polymer pressure, or even a sudden reduction in such pressure, typically seriously impairs the operation of downstream polymer processing apparatus. Therefore, various schemes have been proposed for maintaining polymer pressure during the changing of filters.

U.S. Pat. No. 4,167,384 to Shirato et al discloses polymer filtration apparatus having an inlet that diverges into first and second upstream passages, with first and second downstream passages converging to an outlet. A pair of parallel slide plates are provided, one between each upstream passage and a corresponding downstream passage. For changing a filter screen, only a single slide plate is shifted at a time, whereby the other slide plate remains in its active position, allowing its filter to sustain polymer pressure by permitting continued flow to the outlet. The provision of two completely separate slide plates in corresponding slide channels in the body of the apparatus results in complexity of structure with corresponding expense and difficulty of repair and maintenance.

According to a variation in the Shirato configuration, each of the two slide members supports a pair of screens, whereby one screen is located "on line" or "in normal active position," that is, in a position fully aligned with and communicating between an upstream flow passage and a downstream flow passage, when the other screen has been shifted to a position exterior to the body. In one form, this is accomplished by providing four mutually connected upstream polymer flow passages and four corresponding mutually connected downstream polymer flow passages. These arrangements result in even greater complexity of apparatus.

U.S. Pat. No. 4,395,212 to Lambertus discloses in FIGS. 3 and 4 a screen changer having a pair of upstream flow passages and a corresponding pair of downstream flow passages, with a single slide member having two apertures for replaceable screen filters. The shifting of either filter to a position external to the body of the apparatus simultaneously shifts the other filter from alignment with one pair of upstream and downstream passages to similar alignment with the other pair of passages. The extent of the channel surfaces between the pairs of passages is less than the extent of each of the filter apertures in the slide member, so that throughout the movement of the slide member to replace either filter at least one of the filters is at least partially located in the flow passage of the filter being replaced. Thus polymer flow is not completely blocked at any time during the movement of the slide member. However, the Lambertus arrangement has the inherent disadvantage that during a portion of the movement of the slide member, one of its filter apertures is in direct communication between a flow passage and the exterior of the apparatus. This causes polymer leakage and a severe drop in the polymer pressure, the latter being a particular disadvantage when the system pressure is normally at elevated levels, for example 5,000 p.s.i. The consequent pressure drop is communicated downstream to processing apparatus, and may seriously affect its performance. A further disadvantage is that the slide member must be moved suddenly between the normal position and each of the filter changing positions, eliminating the possibility of prefilling a newly replaced filter in an intermediate position to expel the air within the filter aperture before the filter is inserted in the normal active position.

With a view to overcoming the foregoing and other disadvantages inherent in prior art screen changers, one of the objects of this invention is to provide polymer filtration apparatus of simple construction in which there is continuous polymer flow at all times and in all positions of the filter changing mechanism, and which provides easy access to the filter elements for replacement.

A second object is to provide polymer filtration apparatus in which the filter apertures in the slide member do not provide direct leakage paths from the flow passages to the exterior of the apparatus in any position of the slide member.

The achievement of the foregoing objects, according to this invention, results from an improvement embodied in a structure having a single slide member with two filters and two pairs of polymer flow passages. The dimensions of the filter apertures are related not only to the channel surface dimensions between the pairs of passages, but also to the extents of the channel sealing surfaces of the body between the flow passages and the exterior of the apparatus. As a result, polymer leakage and loss of pressure are substantially avoided, and intermediate or "bleed positions" of the slide member are provided for prefilling each newly replaced filter.

A feature of this invention is that neither filter aperture provides simultaneous direct communication between a flow channel and the exterior of the apparatus in any position during a screen changing cycle. On the other hand, bleed passages may be provided so that prior to insertion of a new filter in a flow passage, it is purged of air and prefilled with polymer from a flow passage, with no possibility of polymer escaping to the exterior of the apparatus, except for necessary limited flow through small metering passages of predetermined dimensions.

BRIEF DESCRIPTION OF THE DRAWING

FIG. 4 is a plan view similar to FIGS. 2 and 3, showing the slide member in a "bleed position" for prefilling and bleeding air from a newly replaced filter screen.

FIG. 5 is an elevation viewed from the direction of line 5—5 in FIG. 4, showing further details of the bleed passages.

DETAILED DESCRIPTION

Figure 1:
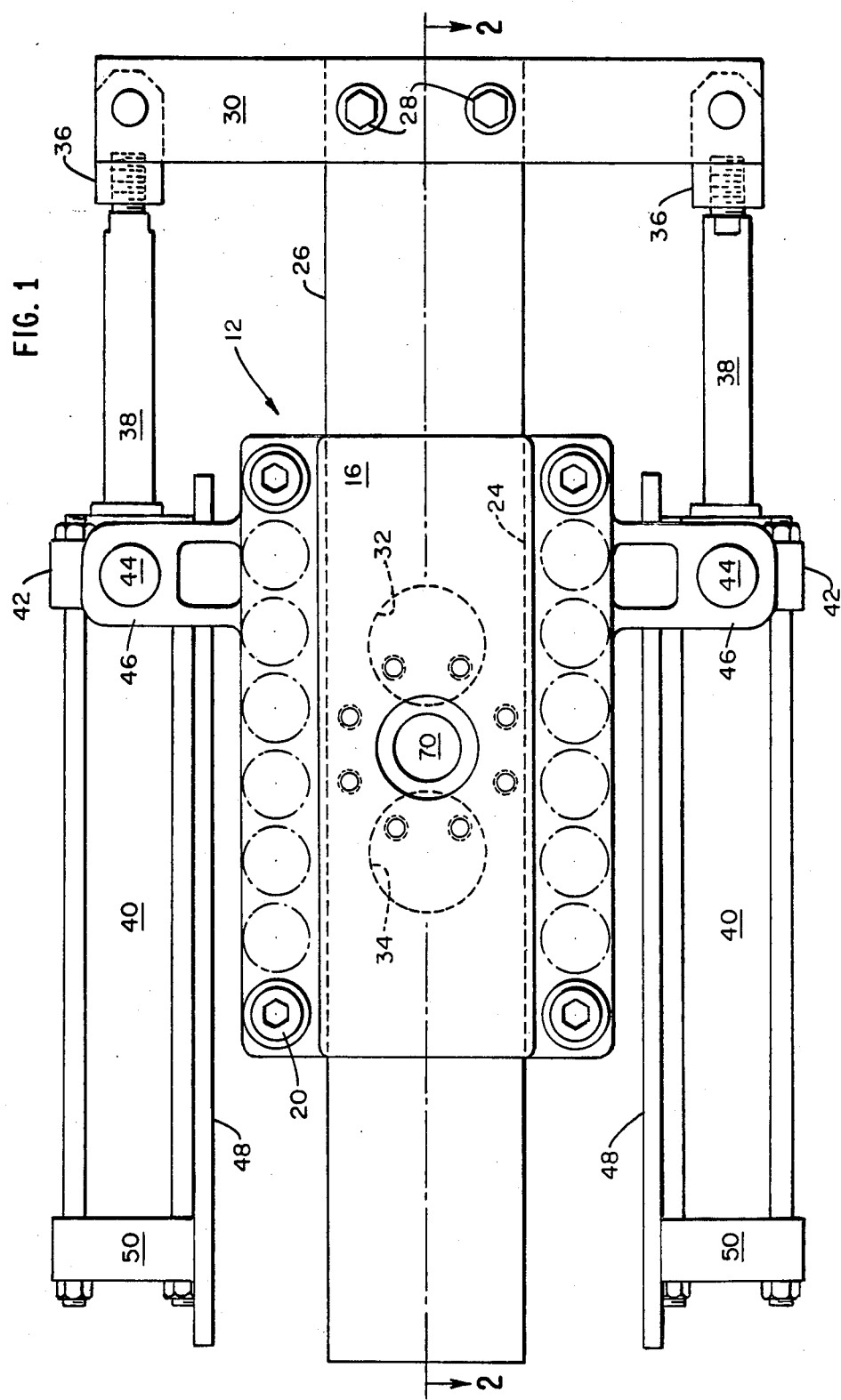
FIG. 1 is an elevation of a preferred embodiment of polymer filtration apparatus according to this invention, taken transversely of the general flow path of polymer through the apparatus.

FIG. 1 is an elevation showing the presently preferred embodiment of polymer filtration apparatus according to this invention. A body 12 comprises a pair of structurally rigid halves 14 and 16 (FIG. 2), a pair of spacer plates 18 and a plurality of tie bolts 20 extending through flanges 22 on the halves 14 and 16, joining them with the plates 18 to form a rigid assembly.

The plates 18 (FIG. 2) and the body halves 14 and 16 form a slide channel 24 of rectangular cross section extending through the body. A slide member 26 also of rectangular cross section is slidingly received in the channel and affixed by bolts 28 to a crossbar 30. The slide member 26 has a pair of filter apertures 32 and 34, details of which are shown in FIGS. 2 to 5.

Blocks 36 are swiveled on the crossbar 30 and are threaded into piston rods 38 which reciprocate in hydraulic cylinders 40. Heads 42 of the cylinders 40 have cylindrical trunnions 44 which are received in brackets 46 integral with or secured to the halves 14 and 16 of the body 12. Protective shields 48 are fixed to the heads 42 and caps 50 of the cylinders 40.

Means (not shown) are provided for application of hydraulic pressure to the cylinders 40, which cause the slide member 26 to reciprocate in the channel 24, moving the slide member a sufficient distance in either direction to locate either of the filter apertures 32 or 34 externally of the body 12.

Each of the filter apertures 32 and 34 in the slide member 26 is a countersunk borehole having a larger upstream diameter D and a smaller downstream diameter D'. This forms an annular shoulder 56 (FIGS. 2 and 3) on which a breaker plate 58 of conventional form is received. Each breaker plate comprises a rigid, removable cylindrical body having a plurality of thru holes 60 evenly distributed throughout its area. Replaceable filter screens 62 and 64 are fitted against and supported by the upstream faces of the breaker plates.

The halves 14 and 16 of the body 12 are each formed with divided internal polymer flow passages. The body halve 14 has an inlet 64, a first upstream passage 66 and a second upstream passage 68, the two passages communicating at one end with the inlet 64 and at the other end with the slide member channel 24. Similarly, the body halve 16 has an outlet 70, a first downstream passage 72 and a second downstream passage 74, the two passages communicating at one end with the outlet 70 and at the other end with the channel 24. The first upstream and downstream passages are mutually opposed at their respective ends communicating with the channel 24, and likewise, the second upstream and downstream passages are mutually opposed at their respective ends communicating with the channel 24. Polymer flows in the directions indicated by the arrows.

Figures 2, 3:
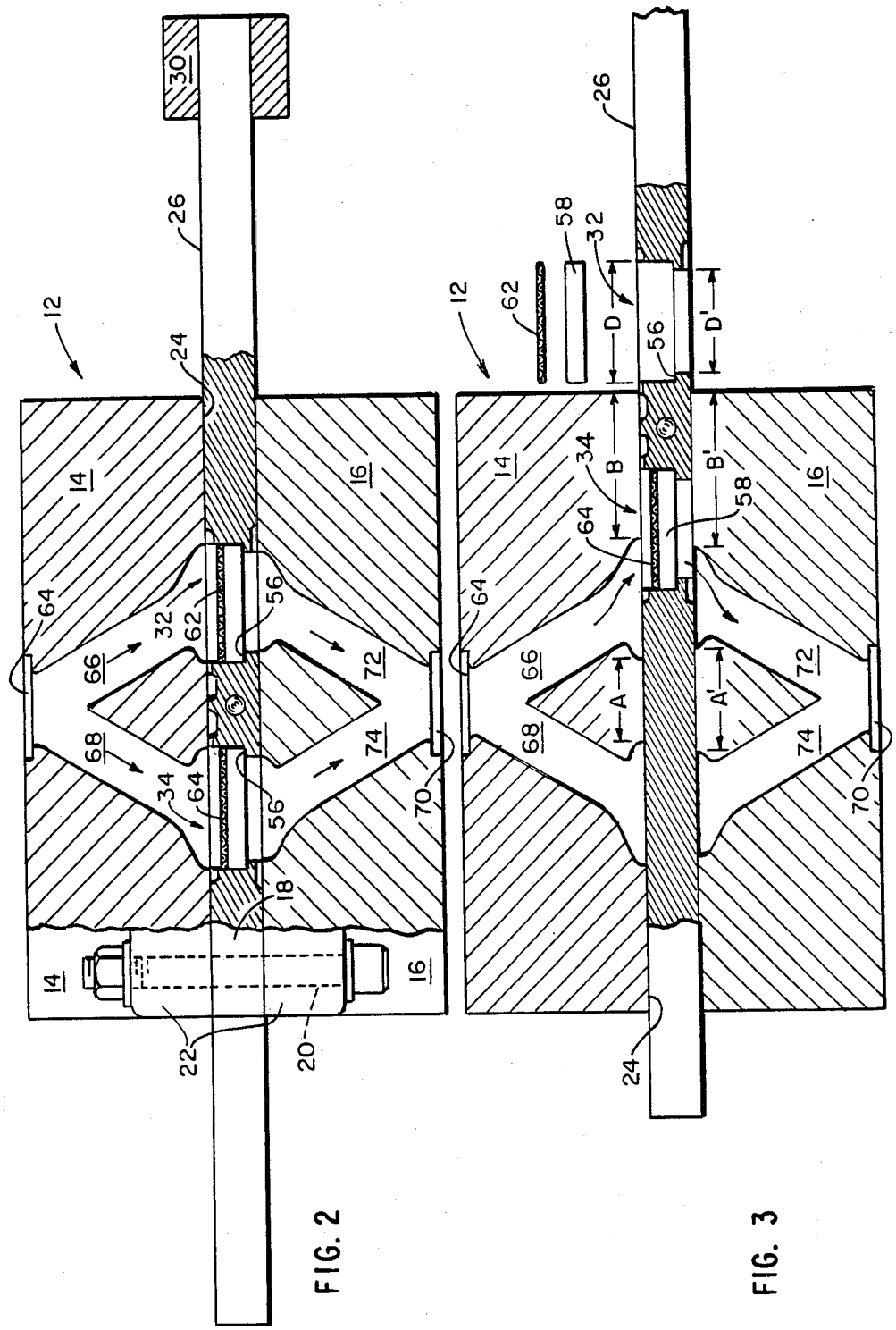
FIG. 2 is a plan view in section taken on line 2—2 of FIG. 1, showing the two filter screens in their normal active positions.
FIG. 3 is a plan view similar to FIG. 2, showing the slide member in a "change position" for replacing one of the filter screens.

According to this invention, it is necessary to comply with certain dimensional criteria. Referring to FIG. 3, the dimension A is the minimum surface distance or extent on the slide channel 24 between the ends of the first and second upstream passages 66 and 68. Likewise, the dimension A' is the minimum surface dimension on the slide channel 24 between the first and second downstream passages 72 and 74. The dimension B is the minimum distance or extent between the end of each of the upstream passages 66 and 68 and the exterior of the body 12; and likewise, the dimension B' is the minimum surface distance between the end of each of the downstream passages 72 and 74 and the exterior of the body 12.

The four following expressions define the necessary dimensional relationships.

(1) $A < D$
(2) $A' < D'$
(3) $B > D$
(4) $B' > D'$

In operation, the foregoing dimensional relationships provide certain operational advantages over the prior art, which are summarized as follows.

Assuming that the slide member 26 is initially in the normal active position illustrated in FIG. 2, if it is desired to replace the right-hand screen 62, the slide member 26 is moved to the right. If it is moved initially a distance D just sufficient to remove the screen 62 from communication with the passage 66, the left-hand screen 64 already will have entered into communication with the passage 66, in view of expression (1). As a result, polymer flow through the passages 66 and 72 will not be completely blocked in any position of the slide member during the movement in this direction.

As the slide member moves further to the right, it ultimately reaches the "change position" illustrated in FIG. 3, wherein the breaker plate 58 and screen 62 are external to the body 12 and may be removed for cleaning and replacement. It will be observed that in the position of FIG. 3, the left-hand screen 64 has a substantial portion of its area in communication with the passages 66 and 72, thus providing for continued polymer flow through these passages. The magnitude of this portion is a function of the dimension B' which preferably exceeds the dimension D' by less than the minimum distance between the apertures 32 and 34 as measured on the downstream side of the slide member 26.

The slide member 26 is of sufficient length that its free end is external to the body 12 in the change position of FIG. 3, thereby providing a seal over the full dimensions B and B', except for the filter apertures 32 and 34, in all positions of the apparatus.

It will also be observed that by reason of expressions (3) and (4) there can be no position of the slide member 26 in which a screen aperture 32 or 34 is in simultaneous direct fluid communication with the polymer flow passages and the exterior of the body 12. This feature makes it possible to provide a so-called "bleed position" of the slide member 26 following the replacement of a screen, as shown in FIGS. 4 and 5. In FIG. 5 the apparatus is viewed in the direction of polymer flow. In the bleed position of the screen 62 no part of the areas defined by the filter dimensions D or D' is situated within either of the adjacent flow passages 66 and 72 or the space external to the body 12. However, as stated above, polymer flow continues through the passages 66 and 72 because the other screen 64 is then in communication with these passages. A groove 76 is formed in the upstream face of the slide member 26. This groove connects with a substantially smaller, accurately dimensioned metering groove 78 also formed in this upstream face. When the screen 62 is in the position illustrated in FIGS. 4 and 5 the grooves 76 and 78 communicate between the upstream passage 66 and the filter aperture 32. A groove 80 is also formed in the upstream face of the slide member 26, and in the illustrated position this groove communicates between the filter aperture 32 and the exterior of the body 12. Thus polymer flows through the grooves 76 and 78 to the filter aperture 32, prefilling the screen 62, the apertures 60 in the breaker plate 58 and all other portions of the aperture 32 communicating therewith, allowing the escape of air to the exterior of the body 12 through the groove 80.

Preferably, a third groove 82 is also formed in the downstream face of the slide member 26. This groove communicates with the filter aperture 32, and is somewhat longer than the groove 80. This permits the movement of the slide member 26 a short distance to the left as viewed in FIG. 4 (to the right as viewed in FIG. 5), to a position in which the groove 82 is in communication with the exterior of the body 12, but the groove 80 is not. In this position, polymer is forced to flow through the screen 62 and apertures 60 by reason of the pressure differential between the two faces of the slide member 26.

In practice, the slide member 26 may remain in the "bleed position" for a substantial period of time, for example several minutes, to allow the complete prefilling of the new screen and the contiguous spaces within the screen aperture, with the complete exhaustion of air from such spaces, prior to shifting the screen 62 into its normal active position communicating between the upstream and downstream passages 66 and 72.

The structure of the slide member 26 is symmetrical with respect to the provision of additional grooves corresponding to the grooves 76, 78, 80 and 82 for the screen 64. If desired, other passages may be provided for prefilling the screens in the bleed position and bleeding air therefrom. These may include passages in the body halves 14 and 16 which communicate with the polymer flow passages, the slide channel and the filter apertures 32 and 34 as well as with the exterior of the body 12. Such passages may have means such as threaded screws accessible on the exterior of the body 12 for selectively opening or blocking such passages, or closing them to an adjustable extent for controlling or metering the rate of flow of air and polymer into and through the spaces as described. In the preferred arrangement shown the groove 78, having the most restricted cross section, determines the rate of flow of prefilling polymer, and its dimensions are predetermined primarily by the characteristics of the polymer and the time required for complete prefilling and air exhaustion.

It will be observed that polymer filtration apparatus according to this invention is so constructed that the slide member 26 provides a seal between the flow passages and the exterior of the body 12 for all positions of the slide member between the normal active position and either of the positions for changing a filter, except that in the "bleed positions" controlled communication between these passages and the exterior is provided through the metering grooves 78, and is limited by the dimensions of these grooves and the time period during which the slide member remains in these positions. These parameters are easily controlled so that the desired prefilling and air bleeding functions may be performed over a significant period of time, ensuring that all air will be exhausted from the screen apertures before the screens are inserted in their normal active positions.

I claim:

1. Polymer filtration apparatus comprising a body having an inlet, first and second upstream passages each communicating at one end with the inlet, an outlet, first and second downstream passages each communicating at one end with the outlet, and a slide channel extending transversely of the passages, the upstream and downstream passages respectively communicating at their other ends with said channel through opposing faces thereof, the other ends of the first and second upstream passages being respectively opposed to the other ends of the first and second downstream passages, said channel having a minimum wall surface extent A between the other ends of the first and second upstream passages, a minimum wall surface extent A' between the other ends of the first and second downstream passages, wall surfaces of minimum extent B between each upstream passage and the exterior of said body, and wall surfaces of minimum extent B' between each downstream passage and the exterior of said body, and slide means adapted for sliding movement in said channel in a direction of said extents and having first and second spaced filter apertures for receiving replaceable filters therein, each aperture having a maximum extent D in said direction of movement on the side communicating with the upstream passages and a maximum extent D' in said direction of movement on the side communicating with the downstream passages, the magnitudes of said extents being related by the expressions $A<D$, $A'<D'$, $B>D$ and $B'>D'$.

2. Polymer filtration apparatus according to claim 1, in which the slide means is adapted for rectilinear movement in said channel.

3. Polymer filtration apparatus according to claim 1, in which the slide means comprises an integral member containing said first and second filter apertures.

4. Polymer filtration apparatus according to claim 1, including means for moving the slide means in said channel from a normal position wherein the first and second apertures communicate between the first upstream and downstream passages and the second upstream and downstream passages, respectively, and a change position wherein one of said apertures is external to said body and the other of said apertures communicates between an upstream and a downstream passage.

5. Polymer filtration apparatus according to claim 4, in which the means for moving the slide means is adapted to locate it in a bleed position wherein one of the apertures is isolated from direct communication with the passages and the exterior of said body.

6. Polymer filtration apparatus according to claim 5, having means communicating between a channel and an aperture in said bleed position and between said aperture in said bleed position and the exterior of said body.

7. Polymer filtration apparatus according to claim 6, in which said communicating means comprise grooves in the surface of the slide means.

8. Polymer filtration apparatus according to claim 3, in which the means for moving the slide means is adapted for movement in opposite senses of said direction of movement for locating the first and second filter apertures, respectively, at exterior of said body.

9. Polymer filtration apparatus according to claim 8, in which the slide means comprises an integral member containing said first and second filter apertures.

* * * * *